United States Patent Office 2,886,591

Patented May 12, 1959

2,886,591

PRODUCTION OF ACRYLIC ACID ESTERS

Hans Lautenschlager, Ludwigshafen (Rhine), and Herbert Friederich, Worms, Germany, assignors to Badische Anilin- & Soda-Fabrik Aktiengesellschaft, Ludwigshafen (Rhine), Germany No Drawing. Application April 17, 1957
Serial No. 653,280

Claims priority, application Great Britain
April 18, 1956

11 Claims. (Cl. 260—486)

This invention relates to a process for the production of acrylic compounds from acetylene, carbon monoxide and a compound with reactive hydrogen.

It is known that acrylic acid and its functional derivatives (hereinafter referred to as acrylic compounds) can be prepared by the reaction of acetylene, a compound with reactive hydrogen and nickel carbonyl or carbon monoxide in the presence of carbonyl-forming metals or their compounds.

The object of the present invention is a process for the production of acrylic compounds in which acetylene is reacted with carbon monoxide and a compound with reactive hydrogen atom at low pressure in the presence of catalysts. A further object of the invention is the production of nickel carbonyl which can be used in situ for the synthesis of acrylic compounds. Further objects and advantages of the invention will be apparent from the following detailed description and the examples.

We have found that acrylic compounds are obtained in a specially suitable way by reacting a compound of the acetylene series, especially acetylene itself, with carbon monoxide and a compound with a reactive hydrogen atom at low pressure and in an acid medium in the presence of nickel carbonyl and a small amount of an organic compound which is capable of forming, with a nickel compound, a compound of a higher order, i.e. a complex compound of a nickel compound and an organic compound.

This method is of special interest when using catalytic amounts of nickel carbonyl, by which are to be understood such amounts of the said substance that the carbon monoxide contained therein is of subordinate importance as compared with the carbon monoxide which is used as free gaseous carbon monoxide. Of the carbon monoxide reacting with the acetylene in the formation of the acrylic compounds, preferably only about 1 to 20%, especially only about 5 to 10%, is supplied to the reaction medium in combined form as nickel carbonyl. The remainder of the carbon monoxide is supplied as free carbon monoxide. Obviously larger amounts of nickel carbonyl can also be used, but working with small amounts of nickel carbonyl is advantageous for economical reasons.

A further advantage of the present invention consists in the fact that it is not necessary, as in the known method of operation, to initiate the reaction of acetylene, nickel carbonyl and a compound with a reactive hydrogen atom in the absence of carbon monoxide before a mixture of acetylene and carbon monoxide is supplied to the reaction vessel. On the contrary it is possible to begin the reaction, by the addition of the complex-forming compounds, in the presence of a mixed gas of acetylene and carbon monoxide such as is necessary for the reaction.

The process may be carried out with good yields and good throughputs at normal pressure. Slightly increased pressure, as for example up to a total pressure of 7 but below 10 excess atmospheres, may be used. It is preferable, however, to work at pressures below the ignition limits of the gas mixture, preferably at pressures up to 3 excess atmospheres. Favorable reaction temperatures lie between 0° and 150° C. Temperatures between 40° and 100° C. are preferred.

The additions which form compounds of higher order with the nickel compounds include various classes of compounds. It is essential however that they form with nickel carbonyl compounds which contain the carbon monoxide in a more unstable form than nickel carbonyl. Suitable additional substances may be recognized by the fact that they set free carbon monoxide in a solution of nickel carbonyl in ethyl alcoholic hydrochloric acid at room temperature.

The following compounds may be given as examples of complex-forming activators:

(1) Primary, secondary and tertiary amines and the onium compounds derived therefrom, such as aliphatic and alicyclic monoamines and polyamines, for example normal butylamine, diethylamine, triethylamine, aminocyclohexane, ethylene diamine, 1.3-diaminopropane, 1.2.3-triaminopropane, N.N′-tetramethylethylene diamine, N.N-dimethylethanolamine, tetramethylammonium chloride, triethylbutyl-ammonium chloride, trimethyl-ammonium chloride, benzyl-ammonium chloride and aromatic monoamines and polyamines, for examples aniline, dimethylaniline, ortho-, meta- and para-toluidine, ortho-, meta-and para-cresidine, ortho-, meta- and para-phenylene diamine, beta-naphthylamine, aniline hydrochloride, N-methylanilinium bromide, and heterocyclic amines, for example pyridine, collidine, piperidine, pyrrolidine, imidazole, alpha.alpha′-dipyridyl, quinoline, quinaldine and normal butyl pyridinium bromide.

(2) Tertiary phosphines and their onium compounds, as for example triphenyl phosphine, triphenylbutyl phosphonium chloride, triphenylethyl phosphonium iodide and tridodecylethyl phosphonium bromide.

(3) Compounds with carbonamide structure, such as N-substituted and N-unsubstituted amides of aliphatic and alicyclic mono- and poly-carboxylic acids, as for example acetamide, acetanilide, N-methylpropionic acid anilide, dimethyl-formamide, N-butyl-formamide, N-ethanol-formamide, butyric acid pyrrolidide, N-formylhexamethylene imine, lauric acid dimethylamide, acetic acid didodecylamide, stearic acid amide, adipic acid diamide, oxalic acid-N.N′-dimethylamide, cyclohexylcarboxylic acid diethylamide, cyclopentylacetic acid ethylamide and N-substituted and N-unsubstituted lactams, as for example N-methylpyrrolidone-2, pyrrolidone-2, piperidone-2, epsilon-caprolactam, N-ethylepsilon-caprolactam, omega-caprylactam, omega oenantholactam, and amides of armoatic mono- and poly-carboxylic acids, as for example benzoic acid dimethylamide, terephthalic acid bis-diethylamide, phthalic acid bis-dibutylamide, orthonaphthoic acid-N-methylamide, and amides for heterocyclic carboxylic acids, such as 2-furane carboxylic acid dimethylamide, 2-thiophene carboxylic acid amide, nictoinic acid diethylamide, and imides of aliphatic or aromatic carboxylic acids, such as succinimide, glutarimide, phthalimide and also the thioamides corresponding to the above-mentioned groups, as for example thioacetamide, thiopyrrolidone and thiocaprolactam, and unsubstituted and N-substituted ureas, such as aliphatic substituted ureas, for example N.N′-tetramethylurea, N.N′-di-n-butylurea, ethyleneurea, N-monomethylurea, trimethylurea, isoamylurea and aromatic substituted ureas, such as N.N′-diphenylurea, N-monophenylurea and para-tolylurea, and carbohydrazides, such as semicarbazide, 1-phenylsemicarbazide, hydrazodicarbonamide, diphenylcarbazide, and urethanes, as for example ethylurethane and carbanilic acid ethyl ester.

(4) Compounds which are capable of forming inner-complex salts of nickel, such as aromatic and aliphatic hydroxy-acids, for example salicylic acid, 2-hydroxynaphthoic acid, tartaric acid, lactic acid, glycolic acid and aliphatic and aromatic ketoacids and their esters, for example pyroracemic acid, methyl pyroracemate, orthobenzoylbenzoic acid, acetoacetic acid, ethyl acetoacetate and aliphatic and aromatic aminocarboxylic acids, as for example glycocoll, alanine, sarcosine, valine, nitrilotriacetic acid, ethylene diamine tetra-acetic acid, phenylglycine, phenylalanine, anthranilic acid and hydroxyaldehydes and hydroxyketones, for example salicyl aldehyde, 3.5-dichloro-2-hydroxy-benzaldehyde and benzoin, and alpha- and beta-diketones, for example diacetyl, hexanedione-2.3, benzil, acetylacetone, benzoylacetone and the oximes, hydrazones, Schiff's bases, phenylhydrazones and semicarbazones derived therefrom, as for example ortho-hydroxybenzylidene - N - phenylimine, di-ortho-hydroxybenzylidene ethylene di-imine, benzoin oxime, diacetyl dioxime and 2.3-hexanedione hydrazone, and azo compounds, such as ortho-hydroxyazobenzene, the coupling product from 4-acetaminoaniline and 4-methylphenol, or from 3.4-dichloraniline and 1-methyl-4-hydroxyquinoline-(2) and other compounds forming inner complexes, such as 8-hydroxyquinoline, isonicotinic acid hydrazide, 2′-hydroxybenzophenone-2-carboxylic acid, indigo and pyrrole-2-aldehyde oxime.

(5) Compounds which contain divalent sulfur atoms, such as aliphatic, aromatic and heterocyclic mercaptans, as for example ethyl mercaptan, 1.3-dimercaptopropane, 2-mercapto-ethanol, thiophenol, 2.5-mercaptothiodiazole and aliphatic, aromatic and heterocyclic thio ethers, such as diethyl sulfide, 1.2-diethylmercaptoethane, 1.3-diethylmercaptopropane, diphenyl sulfide, thiophane, thiophene, thiodiglycol, thiodibutyric acid, thiodipropionic and corresponding heterocyclic compounds, such as thiazole, 4.4′-dithiazolyl and phenothiazine, and aliphatic and aromatic disulfides, such as diethyl disulfides and diphenyl disulfide.

(6) Nitriles, such as aliphatic mono- and poly-nitriles, for example acetonitrile, propionitrile, acrylonitrile, hydracrylonitrile, succinic acid dinitrile, malonic acid dinitrile, adipic acid dinitrile and aromatic nitriles, such as benzonitrile, phthalonitrile and 1-naphthonitrile.

It is not necessary to introduce the complex-forming substances as such; if desired they may also be allowed to form in the reaction medium by adding the compoments from which they can form.

Examples of some preferred activators are: triethyl butyl ammonium bromide or chloride, N-butylpyridinium chloride, triphenyl butyl phosphonium bromide, N-methylpyrrolidone-2, caprolactam, N.N′-diphenylurea, 1.2-diethylmercaptoethane, acetylacetone, salicylic acid, thiodibutyric acid, dimethyl formamide and adipic acid dinitrile.

As a rule 0.1 to 15% of the said activators, with reference to the weight of the reaction mixture, are used. In many cases, even traces are effective.

According to a special modification of the process, the nickel carbonyl can be prepared by treatment of nickel salt solutions with carbon monoxide, preferably in the presence of the complex-forming activators. Since the nickel carbonyl formed need not be isolated, the mixture containing nickel carbonyl obtained can be immediately reacted with the initial materials for the synthesis of the acrylic compounds.

As nickel compounds there come into question the salts of various inorganic or organic acids, such as halogen hydracids, sulfuric acid, nitric acid, hydrocyanic acid, carbonic acid, propionic acid, butyric acid and acrylic acid.

It is preferable to work at temperatures between 50° and 250° C. and increased carbon monoxide pressures, especially between 50 and 200 atmospheres. Considerably higher pressures, for example 700 atmospheres, may be used however. When care is taken that the carbonyl formed is removed by the waste gas from the reaction chamber, it is possible to work with relatively low pressures, as for example 30 to 50 atmospheres.

In the production of the nickel carbonyl the procedure may be that the nickel salt and complex-forming substance are used in stoichiometrical proportions even when the compounds are solid at room temperature. It is however possible to use the complex-forming substance or the nickel salt in excess or also to introduce the components of the complex salt singly. It is furthermore possible to add water and/or alcohols. The addition of inert solvents, such as acetone or tetrahydrofurane, is also possible. When using the complex salts alone or aqueous solutions of the same, the nickel carbonyl formed separates out as a colorless layer. When adding alcohols or solvents, the reaction products are usually homogeneous.

A considerable advantage of this method of preparation of nickel carbonyl consists in the fact that it permits the direct preparation of catalyst-containing solutions of nickel carbonyl in alcohols, which can be used for the synthesis of acrylic acid esters without isolation.

The recovery of nickel carbonyl from the used catalyst in the synthesis of acrylic compounds is of special interest.

In the production of acrylic acid esters, the procedure is preferably that alcohol which contains nickel carbonyl is added with intense stirring to a reaction mixture which contains preformed acrylic acid ester, and at the same time a mixture of acetylene and carbon monoxide is led in. It is also possible to begin the reaction, however, with alcohols which contain no preformed acrylic acid ester. The acid necessary for the maintenance of an acid medium can be added in the gas phase—as in the case of hydrogen chloride, or in alcoholic or aqueous solution, as when using hydrogen bromide, hydrogen iodide, acetic acid or acrylic acid. Inert solvents, such as acetone, methyl ethyl ketone, tetrahydrofurane or dioxane, may also be added to the reaction mixture. The ratio of acetylene to carbon monoxide can be varied within wide limits, for example between 40 to 90% by volume of acetylene and 10 to 60% by volume of carbon monoxide, but it is most advantageous to work with about equimolecular mixtures.

The concentration of nickel carbonyl in the reaction medium should preferably be between 1 and 10%, especially between 2 and 5%, with reference to the weight of the reaction mixture.

To begin the reaction the reaction mixture can be heated to 40° to 70° C., preferably under a mixed gas atmosphere. The beginning of the reaction can be detected by a rise in temperature and often by the occurrence of a sudden change in color. In some cases it is necessary to cool from this point of time. Usually a dark brown coloration occurs at the beginning of the reaction, which often changes to olive and finally to green. The kind of coloration is however largely dependent on the nature of the activator added.

In the production of acrylic acid esters according to the present invention there may be used above all saturated monohydric alcohols of the aliphatic series with primary, secondary or tertiary radicals, as for example methanol, ethanol, propanol, normal-butanol, amyl alcohol, secondary butanol, isopropanol, isobutanol and tertiary butanol. However, alicyclic alcohols also come into question, such as cyclohexanol or methylcyclohexanol, and unsaturated aliphatic alcohols, such as allyl, methallyl, crotyl and propargyl alcohol. Araliphatic alcohols, such as benzyl alcohol can also be used. Polyhydric alcohols, such as ethylene glycol, propylene glycol, glycerine, pentaerythritol or mannitol can also be used, and only one or more than one OH-group may enter into reaction. Finally the alcohols may be substituted in other ways, for example by halogen, ether groups, nitro groups or keto groups. Other suitable compounds with reactive hydrogen are for example phenols, enols, water and amines.

As the acid, it is preferred to use hydrogen chloride, but any other inorganic or organic acid or any other acid-reacting compound which reacts at room temperature with nickel carbonyl with the formation of carbon monoxide and hydrogen may also be used. The acids can be used in an amount of 25 to 150% of the weight calculated as equivalent to the amount of nickel carbonyl used, but especially in amounts of between 50 and 90%. It is also possible to use acid-reacting compounds which act at the same time as activators, such as salicylic acid, tartaric acid, lactic acid, thiodibutyric acid and enolizable compounds, such as acetylacetone and benzoylacetone.

The following examples will further illustrate this invention but the invention is not restricted to these examples. The parts specified in the examples mean parts by weight. By mixed gas is meant a gas mixture of equal volumes of acetylene and carbon monoxide.

*Example 1*

A three-necked flask fitted with a reflux condenser, stirring means, gas supply and overflow tube is charged with 784 parts of ethanol, 784 parts of ethyl acrylate, 33 parts of nickel tetracarbonyl and 33 parts of triphenylbutyl phosphonium bromide. The air is expelled with mixed gas and the mixture heated to 60° C. The waste gas is led through a cooling receiver. Then 54 parts of mixed gas and 2.4 parts of hydrogen chloride per hour are led in. After 8 minutes, the reaction begins with a brown coloration of the mixture and a rise in temperature to 70° C.

Then 246 parts of a mixture of 94% of alcohol, 3% of nickel carbonyl and 3% of triphenyl butyl phosphonium bromide are added per hour. The temperature of the mixture is kept at 70° C. After 4 hours, 2,852 parts of reaction mixture are present in all. The mixture no longer contains nickel carbonyl. In the cooling receiver 42 parts of solid nickel carbonyl are recovered. By distillation there are obtained 2,770 parts of a 45% solution of ethyl acrylate in ethanol and also 81.2 parts of a green solid catalyst residue.

In order to test the suitability of triphenyl butyl phosphonium bromide as an activator for nickel carbonyl in accordance with this invention, the following experiment is carried out:

1 part of triphenyl butyl phosphonium bromide is dissolved in 10 parts of 10% ethyl alcoholic hydrochloric acid. 2 parts of nickel carbonyl are added to this solution at a temperature of 20° C. in a test tube. There immediately takes place a vigorous evolution of carbon monoxide, the solution rapidly becoming colored green.

If 10 parts of 10% ethyl alcoholic hydrochloric acid is mixed with 2 parts of nickel carbonyl under otherwise identical conditions, carbon monoxide is evolved only in traces even after standing for a long time. The solution does not acquire a pale green color until after hours.

If in the process described in this example the triphenyl butyl phosphonium bromide is replaced with an equal amount of triethyl butyl ammonium bromide, 2,916 parts of a reaction mixture are obtained after 4 hours. In the cooling receiver 47 parts of solid nickel carbonyl are recovered. By distillation, 2,840 parts of a 51% solution of ethyl acrylate in ethanol and besides 76 parts of a crystalline blue catalyst residue are obtained.

*Example 2*

An apparatus is used which consists of a vertical tube with a cooling or heating jacket, a receiver with an over flow and two pumps which provided for the circulation of the reaction mixture and of the heating or cooling water. A gas inlet pipe is provided at the lower end of the vertical tube. The waste gas is led through a cooled receiver.

The apparatus is charged with 1650 parts of a mixture of 46.8% of ethanol, 46.8% of ethyl acrylate, 5% of N-methylpyrrolidone and 1.4% of nickel tetracarbonyl. After expelling the air with mixed gas, the whole is heated to 65° C. Then 160 parts of mixed gas and 15 parts of hydrogen chloride are led in per hour. After 5 minutes, the mixture becomes brown in color. Then 573 parts of a mixture of 90% of alcohol, 5% of N-methylpyrrolidone and 5% of nickel carbonyl are added per hour. The reaction solution then becomes olive in color. After 4 hours, 4,264 parts of reaction mixture are present in all. 124 parts of solid nickel carbonyl are present in the cooled receiver. By distillation, 3,962 parts of a 44% solution of ethyl acrylate in ethanol are obtained besides 294 parts of solid green catalyst residue.

*Example 3*

A three-necked vessel provided with stirring means, reflux condenser and gas inlet pipe is charged with 100 parts of ethanol, 10 parts of adipo-dinitrile and 2 parts of nickel tetracarbonyl. The air is suppressed by mixed gas. The waste gas is led through a washing flask and through a cooled receiver. The mixture is heated to 65° C. and a weak current of mixed gas is led into the reaction mixture while stirring. Then 10 parts of a 30% alcoholic hydrochloric acid are allowed to drip in during the course of 3 hours. After 3 minutes, the mixture absorbs the mixed gas so vigorously that reduced pressure is set up in the apparatus. The supply of mixed gas is regulated so that some waste gas always leaves the apparatus. The temperature is kept between 68° and 70° C. After an hour, the introduction of 5 parts of nickel carbonyl in 10 parts of ethanol is commenced and completed within 2 hours. The process is completed after 3 hours in all. The reaction mixture is brown in color. 6 parts of solid nickel carbonyl have separated in the cooled receiver. By distillation there are obtained 123 parts of a 15.5% solution of ethyl acrylate in ethanol, besides 18 parts of a catalyst residue.

*Example 4*

100 parts of alcohol and 25 parts of N-methylpyrrolidone are charged into the apparatus described in Example 3. After a temperature of 65° C. has been reached under a mixed gas atmosphere, 8 parts of nickel carbonyl in 8 parts of ethanol and 5 parts of 30% alcoholic hydrochloric acid are allowed to drip in separately during the course of 3.5 hours. After a minute, the reaction sets in with a brown coloration. The mixed gas is supplied as in Example 3. After 3.5 hours, the reaction is discontinued.

148 parts of a green reaction product have been formed containing a brown precipitate of nickel chloride. By distillation there are obtained 116 parts of a 17% solution of ethyl acrylate in ethanol besides 32 parts of a clear dark blue liquid as a residue. In a receiver cooled with a mixture of Dry Ice and acetone 7.6 parts of solid nickel carbonyl are recovered.

When in the process described above 10 parts of dimethyl formamide are used instead of 25 parts of N-methylpyrrolidone-2 136 parts of a clear green reaction product are obtained. From this reaction product, by distillation, 119 parts of a 21% solution of ethyl acrylate in ethanol and, besides, 16 parts of a dark blue oily residue are obtained. In the cooling receiver 7.4 parts of nickel carbonyl are recovered.

*Example 5*

The apparatus described in Example 3 is charged with 100 parts of alcohol and 10 parts of acetyl acetone. The reaction is carried out as in Example 3 with the addition of 6.5 parts of nickel tetracarbonyl in 10 parts of ethanol and 6 parts of 30% alcoholic hydrochloric acid. The reaction is complete after 2 hours. There are 4.4 parts of solid nickel carbonyl in the cooled receiver. From 131 parts of the brown clear reaction product there are obtained by distillation 118 parts of a 21% solution of ethyl acrylate in ethanol besides 13 parts of a catalyst residue.

*Example 6*

744 parts of normal butanol, 744 parts of butyl acrylate, 80 parts of acetyl acetone and 32 parts of nickel tetracarbonyl are charged into the apparatus described in Example 1. The apparatus is rinsed with mixed gas and the contents heated to 75° C. Then 54 parts of mixed gas are led in per hour. The reaction begins after 3 minutes with a brown coloration and a rise in temperature to 85° C. 196 parts of a mixture of 92% butanol, 5% of acetyl acetone and 3% of nickel carbonyl are added per hour. The temperature is kept constant at 80° C. The reaction is complete after 4 hours.

2,605 parts of a clear brown solution are obtained. By distillation there are obtained 2,410 parts of a 49% solution of butyl acrylate in butanol besides 194 parts of catalyst residue.

*Example 7*

The procedure of Example 6 is followed but the same amount of caprolactam is used instead of acetyl acetone and 3.5 parts of hydrogen chloride per hour are led in with the mixed gas.

46.2 parts of solid nickel carbonyl collect in the cooled receiver. 2,680 parts of a clear green reaction product are obtained which by distillation yields 2,503 parts of a 45% solution of butyl acrylate in butanol besides 176 parts of a solid green residue.

*Example 8*

A mixture of 3.3 parts of nickel chloride, 22 parts of triphenyl butyl phosphonium chloride, 33 parts of butanol and 2 parts of water are brought into reaction in a corrosion-proof shaking autoclave with carbon monoxide for 6 hours at 200° C. and 100 excess atmospheres. The reaction product containing nickel carbonyl is diluted with 130 parts of butanol and treated with mixed gas at 80° C. for 3.5 hours in the apparatus described in Example 3. During this time 6 parts of 30% butanolic hydrochloric acid are allowed to drip in simultaneously. 3 parts of solid nickel carbonyl collect in the cooled receiver. By distillation there are recovered 174 parts of a 23% solution of butyl acrylate in butanol; there are also 23 parts of a solid olive-brown catalyst residue.

*Example 9*

A solution of 10 parts of thiodibutyric acid in 100 parts of n-butanol is charged into an apparatus of the type described in Example 3. The solution is heated to 80° C. while an acetylene carbon monoxide gas mixture is passed through and then 6.5 parts of nickel carbonyl ($Ni(CO)_4$) in 10 parts of n-butanol are added dropwise in the course of 2½ hours. Ten minutes after the dropwise addition of the nickel carbonyl solution has started, the reaction occurs with the reaction mixture assuming an olive coloration. The mixed acetylene-carbon monoxide gas is supplied as in Example 3.

After 2½ hours 188 parts of a pale green reaction product with a small amount of a grey green precipitate (1 part) are obtained. The solution contains 29.5% of butyl acrylate. 5.2 parts of solid nickel carbonyl are recovered in the receiver, this being cooled with a mixture of Dry Ice and acetone.

If instead of 10 parts of thiodibutyric acid the same amount of salicylic acid is used, the product obtained contains 25.3% of butyl acrylate and 5.5 parts of nickel carbonyl are recovered in the cooled receiver.

*Example 10*

A solution of 11 parts of nickel bromide in 23 parts of N-methylpyrrolidone-2 diluted with 30 parts of ethanol is charged into a titanium made shaking autoclave and reacted therein with carbon monoxide at a temperature of 200° C. and a pressure of 200 atmospheres for 5 hours. After 5 hours the increase in weight is 5 parts.

The reaction product is diluted with another 50 parts of ethanol and further reacted with a mixed gas of acetylene and carbon monoxide, while adding 5 parts of a 30% solution of hydrochloric acid in ethanol as described in Example 4. There are obtained 128 parts of a green reaction product which contains little browncolored precipitate. From this reaction product, by distillation, 103 parts of a 20% solution of ethyl acrylate in ethanol and, besides, 25 parts of a dark blue oily residue are obtained. In the cooled receiver 7.2 parts of solid nickel carbonyl are recovered.

*Example 11*

15.6 parts of the complex compound from 1 mol of nickel bromide and 2 mol 1.2-diethylmercaptoethane are diluted with 30 parts of ethanol, charged into a titanium made shaking autoclave and reacted therein with carbon monoxide at a temperature of 200° C. and a pressure of 100 atmospheres for 5 hours. At the end of this time the increase in weight is 3 parts. The reaction product is then diluted with 50 parts of ethanol and reacted with a mixed gas of acetylene and carbon monoxide as described in Example 10. There are obtained 106 parts of a 19% solution of ethyl acrylate in ethanol. In the cooled receiver 4.6 parts of solid nickel carbonyl are recovered.

*Example 12*

12 parts of nickel chloride ($NiCl_2 \cdot 6H_2O$) are dissolved in 15 parts of N.N'-dimethylurea and 30 parts of n-butanol and the solution is reacted with carbon monoxide in a titanium made shaking autoclave at a temperature of 200° C. and a pressure of 100 atmospheres for 10 hours. The increase in weight amounts to 3 parts. The reaction product is diluted with 50 parts of n-butanol and reacted with a mixed gas of acetylene and carbon monoxide for 3.5 hours, while adding 5 parts of a 20% solution of hydrochloric acid in butanol as described in Example 4. There are obtained 127 parts of a 25% solution of butyl acrylate in butanol. In the cooled receiver 7.7 parts of solid nickel carbonyl are recovered.

We claim:

1. In a process of manufacturing an acrylic acid ester by reaction of acetylene, carbon monoxide and a lower alkanol in an acid reaction medium and in the presence of nickel carbonyl, the improvement which comprises carrying out said reaction in said acid reaction medium containing a catalytic amount of from 1 to 10% by weight, with reference to the reaction mixture, of nickel carbonyl, and at normal pressure up to a pressure below 10 atmospheres in the presence of from 0.1 to 15% with reference to the weight of the reaction mixture of an activator which is an organic compound capable of forming a complex compound with a nickel salt.

2. A modification of the process as claimed in claim 1 wherein nickel carbonyl is used which has been prepared in situ by carbonylation of a nickel compound with carbon monoxide at a pressure between 30 and 700 atmospheres and a temperature between 50° C. and 250° C. in the presence of from 0.1 to 15% with reference to the weight of the reaction mixture of said activator which is an organic compound capable of forming a complex compound with a nickel salt.

3. In a process of manufacturing an acrylic acid ester by reaction of acetylene, carbon monoxide and a lower alkanol in an acid reaction medium and in the presence of nickel carbonyl which comprises carrying out said reaction in said acid reaction medium containing a catalytic amount of from 1 to 10% by weight, with reference to the reaction mixture, of nickel carbonyl, and at normal pressure up to a pressure below 10 atmospheres in the presence of from 0.1 to 15%, with reference to the weight of the reaction mixture, of N-methylpyrrolidone-2.

4. In a process of manufacturing an acrylic acid ester by reaction of acetylene, carbon monoxide and a lower alkanol in an acid reaction medium and in the presence of nickel carbonyl which comprises carrying out said reaction in said acid reaction medium containing a catalytic amount of from 1 to 10% by weight, with reference to the reaction mixture, of nickel carbonyl, and at normal pressure up to a pressure below 10 atmospheres in the presence of from 0.1 to 15%, with reference to the weight of the reaction mixture, of dimethyl formamide.

5. In a process of manufacturing an acrylic acid ester by reaction of acetylene, carbon monoxide and a lower alkanol in an acid reaction medium and in the presence of nickel carbonyl which comprises carrying out said reaction in said acid reaction medium containing a catalytic amount of from 1 to 10% by weight, with reference to the reaction mixture, of nickel carbonyl, and at normal pressure up to a pressure below 10 atmospheres in the presence of from 0.1 to 15%, with reference to the weight of the reaction mixture, of thiodibutyric acid.

6. In a process of manufacturing an acrylic acid ester by reaction of acetylene, carbon monoxide and a lower alkanol in an acid reaction medium and in the presence of nickel carbonyl which comprises carrying out said reaction in said acid reaction medium containing a catalytic amount of from 1 to 10% by weight, with reference to the reaction mixture, of nickel carbonyl, and at normal pressure up to a pressure below 10 atmospheres in the presence of from 0.1 to 15%, with reference to the weight of the reaction mixture, of acetyl acetone.

7. In a process of manufacturing an acrylic acid ester by reaction of acetylene, carbon monoxide and a lower alkanol in an acid reaction medium and in the presence of nickel carbonyl which comprises carrying out said reaction in said acid reaction medium containing a catalytic amount of from 1 to 10% by weight, with reference to the reaction mixture, of nickel carbonyl, and at normal pressure up to a pressure below 10 atmospheres in the presence of from 0.1 to 15%, with reference to the weight of the reaction mixture, of triphenyl butyl ammonium bromide.

8. In a process of manufacturing an acrylic acid ester by carbonylation of acetylene with carbon monoxide in a reaction medium of a lower alkanol, the improvement which comprises carrying out said carbonylation of acetylene at a pressure of from normal pressure up to a pressure below 10 atmospheres and at a temperature of from 0° C. to 150° C. in the presence of an acid reaction medium containing a catalytic amount of from 1 to 10% by weight, with reference to the reaction mixture, of nickel carbonyl and from 0.1 to 15% by weight of an activator which is an organic compound capable of forming a complex compound with a nickel salt.

9. An improved process as claimed in claim 8 wherein the carbonylation of acetylene is carried out at a pressure of from normal pressure to 3 atmospheres and at a temperature of from 40° C. to 100° C.

10. An improved process as claimed in claim 9 wherein the amount of nickel carbonyl is between about 2 and 5% by weight.

11. An improved process as claimed in claim 9 wherein hydrogen chloride is employed as the acid in the reaction medium in a quantity of from 25 to 150% by weight of the nickel carbonyl present.

References Cited in the file of this patent

UNITED STATES PATENTS 2,738,364 Reppe et al. ............ Mar. 13, 1956
2,768,968 Reppe et al. ............ Oct. 30, 1956

FOREIGN PATENTS 872,205 Germany ............ Mar. 30, 1953